United States Patent

Eppert, Jr.

[11] Patent Number: 5,338,801
[45] Date of Patent: Aug. 16, 1994

[54] COMPOSITIONS OF PROPYLENE POLYMER MATERIALS AND OLEFIN POLYMER MATERIALS WITH REDUCED GLOSS

[75] Inventor: Stanley E. Eppert, Jr., New Castle, Del.

[73] Assignee: Himont Incorporated, Wilmington, Del.

[21] Appl. No.: 139,963

[22] Filed: Oct. 20, 1993

[51] Int. Cl.⁵ ............... C08L 23/10; C08L 23/16; C08L 23/26; C08L 53/00
[52] U.S. Cl. .................... 525/232; 525/240; 525/237; 525/211; 525/194; 525/88; 525/95; 525/97; 525/98; 525/99
[58] Field of Search ............ 525/240, 232, 237, 88, 525/194

[56] References Cited

U.S. PATENT DOCUMENTS

| | | | |
|---|---|---|---|
| 4,748,206 | 5/1988 | Nogiwa et al. | 525/240 |
| 5,196,462 | 3/1993 | Berta | 525/94 |
| 5,212,246 | 5/1993 | Ogale | 525/240 |

FOREIGN PATENT DOCUMENTS 0400333 12/1990 European Pat. Off. .

Primary Examiner—Carman J. Seccuro, Jr.

[57] ABSTRACT

Disclosed is a polyolefin composition comprising (A) a propylene polymer material and (B) an olefin polymer material selected from the group consisting of a partially crosslinked thermoplastic elastomer composition, an olefin copolymer rubber and a mixture thereof.

The polyolefin composition of this invention provides reduction in gloss.

7 Claims, No Drawings

COMPOSITIONS OF PROPYLENE POLYMER MATERIALS AND OLEFIN POLYMER MATERIALS WITH REDUCED GLOSS

FIELD OF THE INVENTION

This invention relates to a polyolefin composition, and more specifically to a polyolefin composition comprising (A) a propylene polymer material and (B) an olefin polymer material, and most specifically to a polyolefin composition comprising (A) a propylene polymer material and an olefin polymer material of a partially crosslinked thermoplastic elastomer composition, an ethylene-propylene-conjugated diene terpolymer rubber or a mixture thereof.

BACKGROUND OF THE INVENTION

Olefin polymer materials, in particular propylene polymer materials, have been widely used in various applications, such as fibers, films, sheets and other shaped articles, because of their excellent physical and mechanical properties. However, some of the olefin polymer materials have been found undesirable for applications requiring low gloss, such as thermoforming, extrusion coating, blow molding, injection molding and sheet or film extrusion, because of their high gloss after processing.

Thus, there is a need in the industry for olefin polymer materials having low gloss after processing, and which substantially retain their physical and mechanical properties.

SUMMARY OF THE INVENTION

It has been found that by blending a olefin polymer material with a partially crosslinked thermoplastic elastomer composition, an ethylene-propylene-conjugated diene terpolymer rubber or a mixture thereof, a composition is obtained having reduced gloss.

Accordingly, there is provided a polyolefin composition consisting essentially of (A) from 70 to 90% by weight of a propylene polymer material and (B) from 30 to 10% by weight of an olefin polymer material selected from the group consisting of a partially crosslinked thermoplastic elastomer composition, an ethylene-propylene-conjugated diene terpolymer rubber and a mixture thereof.

DETAILED DESCRIPTION OF THE INVENTION

All parts and percentages used in this application are by weight unless otherwise specified. Ambient or room temperature is approximately 25° C.

Component (A) used in the composition of the present invention is a propylene polymer material consisting essentially of:

(1) from 10 to 50% of a propylene homopolymer, preferably from 10 to 40%, and most preferably from 20 to 35%, having an isotactic index of from 80 to greater than 99%, and preferably from 85 to 99%, or a copolymer selected from the group consisting of (a) propylene and ethylene, (b) propylene, ethylene and a $CH_2=CHR$ alpha-olefin, where R is a $C_{2-8}$ straight or branched alkyl, and (c) propylene and an alpha-olefin, as defined above in (1)(b), wherein said copolymer contains from 85 to 99%, and preferably from 90 to 99% propylene and having an isotactic index greater than 80 to 98%, preferably greater than 85 to 98%, (2) from 5 to 20% of a semi-crystalline, essentially linear copolymer fraction, preferably from 7 to 15%, having a crystallinity of about 20 to 60%, by differential scanning calorimetry (DSC), wherein the copolymer is selected from the group consisting of (a) ethylene and propylene containing over 55% ethylene; (b) ethylene, propylene, and an alpha-olefin, as defined above in (1)(b), containing from 1 to 10% of the alpha-olefin and over 55% up to 98%, preferably from 80 to 95%, of both ethylene and alpha-olefin; and (c) ethylene and an alpha-olefin, as defined in (1)(b), containing over 55% up to 98%, preferably from 80 to 95%, of said alpha-olefin, which copolymer is insoluble in xylene at room or ambient temperature, and (3) from 40 to 80% of a copolymer fraction, preferably 50 to 70%, selected from the group consisting of a copolymer of (a) ethylene and propylene wherein the copolymer contains from 20% to less than 40%, preferably from 20 to 38%, most preferably 25 to 38% ethylene; (b) ethylene, propylene, and an alpha-olefin, as defined in (1)(b), wherein the alpha-olefin is present in an amount of from 1 to 10%, preferably from 1 to 5%, and the amount of ethylene and alpha-olefin present is from 20% to less than 40%; and (c) ethylene and an alpha-olefin, as defined in (1)(b), containing from 20 to less than 40%, preferably 20 to 38%, and most preferably 25 to 38% of the alpha-olefin, and optionally containing 0.5 to 10%, preferably 1 to 5% of a diene, said copolymer fraction being soluble in xylene at ambient temperature, and having an intrinsic viscosity preferably of from 1.7 to 3.0 dl/g, wherein the total amount of ethylene units or said alpha-olefin units in the olefin polymer composition or of ethylene and said alpha-olefin units when both are present in the olefin polymer composition is from 15 to 35%, the total amount of (2) and (3) fractions, based on the total olefin polymer composition is preferably from about 65% to 80%, the weight ratio of (2)/(3) is preferably from 0.1 to about 0.3 and the total content of ethylene or $C_{4-8}$ alpha-olefin or combination thereof in (2+3) is less than 50%, and preferably from 20 to 45%.

The composition of component (A) has at least one melt peak, determined by DSC, present at temperatures higher than 120° C., and at least one peak, relative to the vitreous transition, present at temperatures from −10° C. and −35° C. In addition, these compositions have a flexural modulus of less than 150 MPa, generally from 20 and 100 MPa; a tensile strength at yield of from 10 to 20 MPa, elongation at break over 400%; a tension set, at 75% strain, from 20% to 50%; a Shore D hardness from 20 and 35; haze value of less than 40%, preferably less than 35%, and do not break (no brittle impact failure) when an IZOD impact test is conducted at −50° C. Said component (A) is present in an amount of from 70 to 90%, preferably, and most preferably from 75 to 85% of the total composition.

Component (B) of the present invention is an olefin polymer material selected from the group consisting essentially of:

(1) a partially crosslinked thermoplastic elastomer composition consisting essentially of:
 (a) 50 parts by weight of a thermoplastic elastomer consisting essentially of:

(i) from 30 to 70%, preferably from 20 to 50%, of a propylene homopolymer having an isotactic index greater than 90, preferably greater than 98%, or a crystalline propylene copolymer with ethylene and/or $C_{4-8}$ alpha-olefin having a propylene content greater than 85% and an isotactic index of greater than 85%;

(ii) from 30 to 70%, preferably from 30 to 50%, of an amorphous ethylene-propylene or butene copolymer fraction, optionally containing from 1 to 10%, preferably 1–5%, of a diene, which is xylene soluble at room temperature, and contains from 30 to 70% ethylene;

(iii) from 10 to 30%, preferably from 10 to 20%, of a semi-crystalline ethylene-propylene or butene copolymer which is xylene insoluble at room temperature and contains greater than 90% ethylene, preferably greater than 95%; and (iv) from 2 to 20 parts by weight of polybutene-1 based on 100 parts of (i)+(ii)+(iii), wherein the ratio of polybutene-1 to rubber is less than 0.5; and (b) 55 parts by weight of an olefin rubber composition consisting essentially of:

(i) 16.4% of a homopolymer of propylene having an isotactic index greater than 90, preferably greater than 98%, and (ii) 74.6% of an ethylene-propylene copolymer rubber containing 30 to 70% ethylene; and (2) an ethylene-propylene-conjugated diene terpolymer rubber having an ethylene content of 40 to 77%, preferably from 45 to 75%, and diene content of from 2 to 10%, preferably from 3 to 8%.

In the composition of the present invention preferably component (B) is present in an amount of from 10 to 30%, and preferably from 20 to 15%.

When component (B) is a mixture of component (B)(1) and (B)(2), component (B)(1) is present in the amount of from 5 to 15% and component (B)(2) is present in an amount of from 20 to 10%.

The $C_4$–$C_{10}$ alpha-olefin useful in the preparation of components (A) and (B) of the above propylene polymer material and olefin polymer material include butene-1, pentene-1, hexene-1, 4-methylpentene-1 and octene-1. Butene-1 is particularly preferred.

The diene, when present, is typically a butadiene, 1,4-hexadiene, 1,5-hexadiene, or ethylidene norbornene diene monomer.

The compounding or melt blending of component (A) and component (B), as defined above, of the present invention can be carried out on an open roll, in an internal mixer Banbury or Haake mixers), and single-screw or twin-screw extruders.

The polyolefin composition of the present invention may also contain other conventional additives, for example, antioxidants, stabilizers, extender oils, such as paraffinic and naphthenic oils; fillers, such as $CaCO_3$, talc and zinc oxide; or flame retardants.

The present invention will be illustrated in greater detail with reference to the examples of the invention set forth below. The test samples and gloss properties of the following working examples and comparative examples were prepared and measured according to the following methods:

| Gloss 45° | ASTM D-523-85 |
| --- | --- |
| Melt Flow Rate (MFR) | ASTM D-1238, Condition L |

EXAMPLE 1

A polyolefin composition of the present invention is produced by a general procedure comprising blending (A) Polymer A and Polymer (C), described in Table 1, until a homogeneous mixture is obtained.

The compounded mixture is injection molded on a conventional 5 ounce injection molding machine with a barrel temperature of 420° F. and a water cooled, mold temperature of 80° F. to prepare 40 mil, 3"×3" plaques.

The gloss property is set forth in Table 1.

Control 1

A polyolefin composition was prepared according to the general procedure of Example 1, except that the composition only contained Polymer (A).

The gloss property is set forth in Table 1.

EXAMPLE 2

The composition of example 2 was prepared according to the general procedure of example 1, except that the Polymer (B) was used instead of Polymer (C) as set forth in Table 1.

The gloss property of the compositions are set forth in Table 1.

EXAMPLES 3 and 4

The compositions of examples 3 to 4 were prepared according to the general procedure of example 1, except that the composition also contained Polymer (B), in addition to Polymer (A) and Polymer (C) in Example 1, as set forth in Table 1.

The gloss property of the compositions are set forth in Table 1.

TABLE 1

|  | Con. 1 | Ex. 1 | Ex. 2 | Ex. 3 | Ex. 4 |
| --- | --- | --- | --- | --- | --- |
| Ingredients |  |  |  |  |  |
| Polymer A, % | 100 | 75 | 75 | 75 | 75 |
| Polymer B, % | — | — | 25 | 20 | 10 |
| Polymer C, % | — | 25 | — | 5 | 15 |
| Stabilizer 1 | 0.2 | 0.2 | 0.2 | 0.2 | 0.2 |
| Calcium Sterate | 0.1 | 0.1 | 0.1 | 0.1 | 0.1 |
| Carbon Black | 4 | 4 | 4 | 4 | 4 |
| Properties |  |  |  |  |  |
| 45° Gloss | 44 | 27 | 37 | 32 | 32 |

Polymer A-an olefin polymer composition containing 30% propylene-ethylene random copolymer having an ethylene content of 3.3%, 7% semi-crystalline ethylene-propylene copolymer fraction containing 51.9% ethylene and 63% amorphous ethylene-propylene copolymer fraction containing 31.1% ethylene, which composition has a xylene soluble content of 51%.
Polymer B-an ethylene-propylene-conjugated diene terpolymer rubber.
Polymer C-a partially crosslinked thermoplastic eleastomer composition containing 50 parts by weight of a thermoplastic elastomer containing 40 parts of propylene homopolymer, 50 parts of ethylene-propylene copolymer rubber, 10 parts of semi-crystalline ethylene-propylene copolymer and 10 parts of polybutene-1, blended with 55 parts by weight of an olefin rubber composition consisting essentially of 16.4% of propylene homopolymer and 74.6% of ethylene-propylene copolymer rubber.
Stabilizer 1-Irganox B 225 2,2-bis[[3-[3,5-Bis(1,1-dimethyl-ethyl)-4-hydroxyphenyl]-1-oxopropoxy]methyl]-1,3-propanediyl-3,5-bis(1,1-dimethylethyl)-4-hydroxy-benzenepropanoate stabilizer and tris(2,4-di-tert-butylphenyl) phosphite stabilizer in a 50:50 blend.

As shown in Table 1, the compositions of the present invention reduced the gloss by at least 20%, as compared to control 1.

EXAMPLES 5 to 8

The compositions of Examples 5 to 8 were prepared according to the general method use for the composition of Example 1, except that Lupersol 101 peroxide was used to obtain compositions with varying melt flow rates (MFR).

The gloss properties are set forth in Table 2.

TABLE 2

|  | Con. 1 | Ex. 5 | Ex. 6 | Ex. 7 | Ex. 8 |
|---|---|---|---|---|---|
| Ingredients |  |  |  |  |  |
| Polymer A, % | 100 | 75 | 75 | 75 | 75 |
| Polymer B, % | — | 25 | 25 | 25 | 25 |
| Lupersol 101 | — | 0.01 | 0.01 | 0.01 | 0.01 |
| Stabilizer 1 | 0.2 | 0.2 | 0.2 | 0.2 | 0.2 |
| Calcium Sterate | 0.1 | 0.1 | 0.1 | 0.1 | 0.1 |
| Carbon Black | 4 | 4 | 4 | 4 | 4 |
| Properties |  |  |  |  |  |
| MFR | — | 0.8 | 1.0 | 3.4 | 7.0 |
| 45° Gloss, % | 44 | 33 | 34 | 39 | 38 |

It can be seen that at least a 20% reduction in gloss is obtained in the injection molded plaques prepared from the compositions of the present invention as compared to the composition of control 1.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A polyolefin composition comprising (A) from 70 to 90% of a propylene polymer material consisting essentially of:
   (1) from 10 to 50% of a propylene homopolymer having an isotactic index, or a copolymer selected from the group consisting of (a) propylene and ethylene, (b) propylene, ethylene and a $CH_2=CHR$ alpha-olefin, where R is a $C_{2-8}$ straight or branched alkyl, and (c) propylene and an alpha-olefin, as defined above in (1)(b), said copolymer containing from 85 to 99% propylene and having an isotactic index greater than 80 to 98%,
   (2) from 5 to 20% of a semi-crystalline, essentially linear copolymer fraction having a crystallinity of about 20 to 60%, by differential scanning calorimetry (DSC), wherein the copolymer is selected from the group consisting of (a) ethylene and propylene containing over 55% ethylene; (b) ethylene, propylene, and an alpha-olefin, as defined above in (1)(b), containing from 1 to 10% of the alpha-olefin and over 55% up to 98%, of both ethylene and alpha-olefin; and (c) ethylene and an alpha-olefin, as defined in (1)(b), containing over 55% up to 98% of said alpha-olefin, which copolymer is insoluble in xylene at room or ambient temperature, and
   (3) from 40 to 80% of a copolymer fraction selected from the group consisting of a copolymer of (a) ethylene and propylene wherein the copolymer contains from 20% to less than 40% ethylene; (b) ethylene, propylene, and an alpha-olefin, as defined in (1)(b), wherein the alpha-olefin is present in an amount of from 1 to 10%, and the amount of ethylene and alpha-olefin present is from 20% to less than 40%; and (c) ethylene and an alpha-olefin, as defined in (1)(b), containing from 20 to less than 40% of the alpha-olefin, and optionally with 0.5 to 10% of a diene, said copolymer fraction being soluble in xylene at ambient temperature, and having an intrinsic viscosity of from 1.7 to 3.0 dl/g, wherein the total amount of (2) and (3) fractions, based on the total olefin polymer composition is from about 65% to 80%, the weight ratio of (2)/(3) is from 0.1 to about 0.3, and the total content of ethylene or $C_{4-8}$ alpha-olefin or combination thereof in (2+3) is less than 50% and (B) from 30 to 10% of a olefin polymer material selected from the group consisting of:
   (1) a partially crosslinked thermoplastic olefin elastomer composition consisting essentially of:
      (a) 50 parts by weight of a thermoplastic elastomer consisting essentially of:
         (i) from 30 to 70% of a propylene homopolymer having an isotactic index greater than 90, or a crystalline propylene copolymer with ethylene and/or $C_{4-8}$ alpha-olefin having a propylene content greater than 85% and an isotactic index of greater than 85%;
         (ii) from 30 to 70% of an amorphous ethylene-propylene or butene copolymer fraction, optionally containing from 1 to 10% of a diene, which is xylene soluble at room temperature, and contains from 30 to 70% ethylene;
         (iii) from 10 to 30% of a semi-crystalline ethylene-propylene or butene copolymer which is xylene insoluble at room temperature and contains greater than 90% ethylene; and
         (iv) from 2 to 20 parts by weight of polybutene-1 based on 100 parts of (i)+(ii)+(iii), wherein the ratio of polybutene-1 to rubber is less than 0.5; and
      (b) 55 parts by weight of an olefin rubber composition consisting essentially of:
         (i) a homopolymer of propylene having an isotactic index greater than 90, and (ii) an ethylene-propylene copolymer rubber containing 30 to 70% ethylene; and
   (2) an ethylene-propylene-conjugated diene terpolymer rubber having an ethylene content of 40 to 77%, and diene content of from 2 to 10%; and
   (3) mixtures thereof.

2. The composition of claim 1, wherein component (A) is a propylene polymer material consisting essentially of:
   (1) from 10 to 50% of a copolymer selected from the group consisting of (a) propylene and ethylene, (b) propylene, ethylene and a $CH_2=CHR$ alpha-olefin, where R is a $C_{2-8}$ straight or branched alkyl, and (c) propylene and an alpha-olefin, as defined above in (1)(b),
   (2) from 5 to 20% of a semi-crystalline, essentially linear copolymer fraction having a crystallinity of about 20 to 60%, by differential scanning calorimetry (DSC), wherein the copolymer is selected from the group consisting of (a) ethylene and propylene containing over 55% ethylene; (b) ethylene, propylene, and an alpha-olefin, as defined above in (1)(b), containing from 1 to 10% of the alpha-olefin and over 55% up to 98%, of both ethylene and alpha-olefin; and (c) ethylene and an alpha-olefin, as defined in (1)(b), containing over 55% up to 98% of said alpha-olefin, which copolymer is insoluble in xylene at room or ambient temperature, and (3) from 40 to 80% of a copolymer fraction of ethylene and propylene wherein the copolymer contains from 20% to less than 40% ethylene, wherein said copolymer fraction being soluble in xylene at ambient temperature, and having an intrinsic viscosity of from 1.7 to 3.0 dl/g, wherein the total amount of (2) and (3) fractions, based on the total olefin polymer composition is from about 65% to 80%, the weight ratio of (2)/(3) is from 0.1 to about 0.3, and the total content of ethylene or $C_{4-8}$ alpha-olefin or combination thereof in (2+3) is less than 50% and.

3. The composition of claim 2, wherein component (B) is a partially crosslinked thermoplastic elastomer composition consisting essentially of:
   (1) 50 parts by weight of a thermoplastic elastomer consisting essentially of:
      (a) from 30 to 70% of a propylene homopolymer having an isotactic index greater than 90, or a crystalline propylene copolymer with ethylene and/or $C_{4-8}$ alpha-olefin having a propylene content greater than 85% and an isotactic index of greater than 85%;
      (b) from 30 to 70% of an amorphous ethylene-propylene or butene copolymer fraction, optionally containing from 1 to 10% of a diene, which is xylene soluble at room temperature, and contains from 30 to 70% ethylene;
      (c) from 10 to 30% of a semi-crystalline ethylene-propylene or butene copolymer which is xylene insoluble at room temperature and contains greater than 90% ethylene; and
      (d) from 2 to 20 parts by weight of polybutene-1 based on 100 parts of (a)+(b)+(c), wherein the ratio of polybutene-1 to rubber is less than 0.5; and
   (2) 55 parts by weight of an olefin rubber composition consisting essentially of:
      (a) a homopolymer of propylene having an isotactic index greater than 90, and
      (b) an ethylene-propylene copolymer rubber containing 30 to 70% ethylene.

4. The composition of claim 2, wherein component (B) is an ethylene-propylene-conjugated diene terpolymer rubber having an ethylene content of 40 to 77%, and diene content of from 2 to 10%.

5. The composition of claim 2, wherein component (B) is a mixture (B) (1) and (B) (2) .

6. The composition of claim 5, wherein component (B)(1) is present in an amount of from 5 to 15% and component (B)(2) is present in an amount of from 20 to 10%.

7. The composition of claim 1, wherein component (A) is present in an amount of from 75 to 85% and component (B) is present in an amount of from 25 to 15%.

* * * * *